Sept. 3, 1968  NOBORU AMANO  3,400,268
SYSTEM FOR A.C. OPERATION OF AN IONIZATION CHAMBER
Filed Dec. 17, 1964  2 Sheets-Sheet 1

INVENTOR.
NOBORU AMANO
BY
Kurt Kelman
AGENT

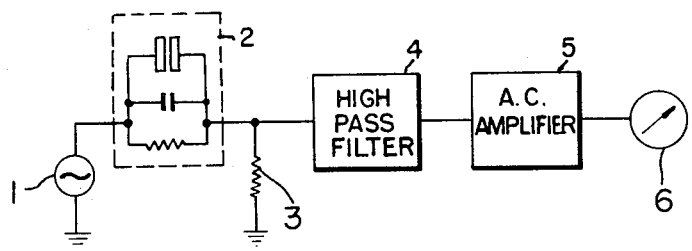
Fig. 4
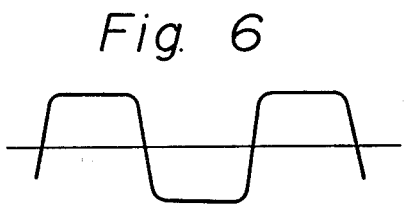
Fig. 5
Fig. 6
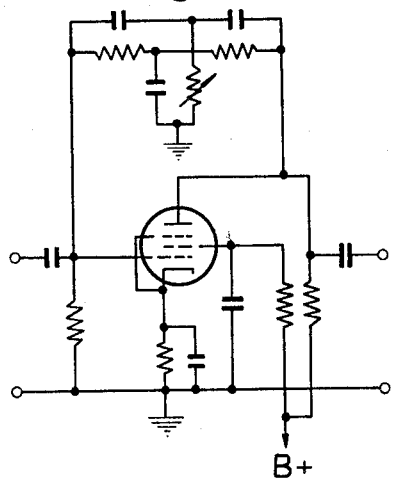
Fig. 7

3,400,268
SYSTEM FOR A.C. OPERATION OF AN IONIZATION CHAMBER
Noboru Amano, Mito-shi, Japan, assignor to Japan Atomic Energy Research Institute, Minato-ku, Tokyo, Japan
Filed Dec. 17, 1964, Ser. No. 419,180
Claims priority, application Japan, Dec. 23, 1963, 38/68,995
1 Claim. (Cl. 250—83.6)

---

ABSTRACT OF THE DISCLOSURE

An ionization chamber operated by an A.C. source of frequency $fo$ and a stable A.C. amplifier at the output of the chamber. A high pass or band pass filter in the output circuit passes only the odd harmonics of the frequency $fo$ contained in the signal current but not the fundamental frequency $fo$ of the leakage current.

---

This invention relates to a system for the alternating current operation of an ionization chamber.

In general, a D.C. is applied to an ionization chamber in order to measure nuclear radiations and the minute output D.C. current of the ionization chamber is amplified by a D.C. amplifier. A known defect of this method is that the zero point of a D.C. amplifier essentially drifts and the drift of the zero point causes measuring errors. In order to eliminate the defects it is common usage to convert a D.C. signal to an A.C. signal and amplify it by an A.C. amplifier. If an A.C. voltage is applied to an ionization chamber as the driving source and an A.C. output is taken out from the ionization chamber, the signal current can be amplified by a stable A.C. amplifier and therefore, a stable instrument for measuring nuclear radiations can be obtained.

Heretofore, operating an ionization chamber by applying to it an A.C. voltage has not been utilized effectively due to the leakage current caused by the inter-electrode capacitance of the ionization chamber. Therefore, a D.C. amplifier is utilized in spite of the high technical difficulty. A D.C. amplifier is commonly used in the nuclear instrumentation of a nuclear reactor which requires high reliability and stability, and D.C. amplifiers often cause instability of instrumentation.

It is an object of the invention to provide a stable measuring system for nuclear radiations by applying an A.C. voltage to an ionization chamber, and amplifying the A.C. output of the ionization chamber.

Figure 1:
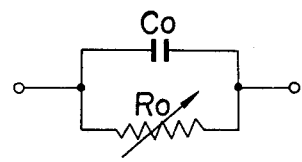

The objects and advantages of this invention will become readily apparent from the following detailed description, in which:

FIG. 1 shows an equivalent circuit of an ionization chamber.

Figure 2:
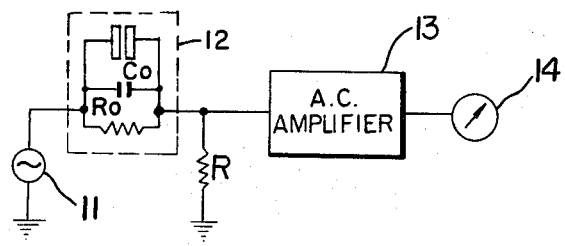
Figure 3:
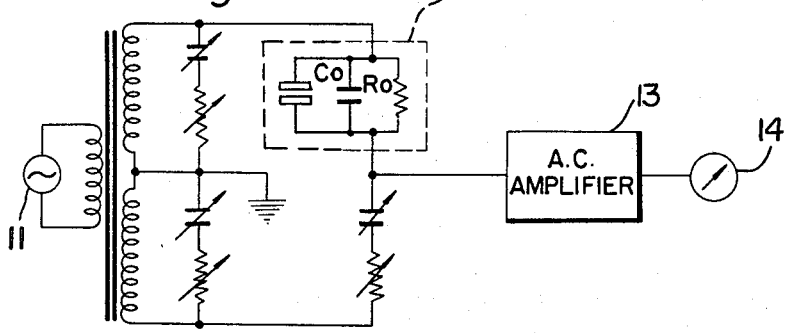

FIG. 2 is a schematic diagram which explains the A.C. operation of an ionization chamber, FIG. 3 is a schematic diagram of an embodiment of a conventional A.C. operation system of an ionization chamber in which a bridge circuit is utilized, FIG. 4 is a schematic diagram of an embodiment of an A.C. operation system of an ionization chamber according to this invention, FIG. 5 shows the relation between the output current and the applied voltage of an ionization chamber, FIG. 6 shows the wave form of the output signal current of the ionization chamber operated by an A.C. voltage as in the system shown in FIG. 4, and FIG. 7 is an embodiment of a band-pass filter.

In FIG. 1, the conventional equivalent circuit of an ionization chamber is represented by a parallel circuit comprising the internal resistance $Ro$ and the inter-electrode capacitance $Co$ and it is assumed that the internal resistance $Ro$ changes in accordance with the intensity of the nuclear radiations.

In FIG. 2, an ionization chamber 12 is operated by an A.C. voltage source 11 and the output of ionization chamber 12 is applied to an A.C. voltmeter 14 through an A.C. amplifier 13. Under these A.C. operations, a leakage current flows into a load resistance R through the inter-electrode capacitance $Co$ in addition to the signal current flowing into the load resistance R through the internal resistance $Ro$ and the leakage current causes a large error. The circuit is therefore, not utilized in practice.

In FIG. 3, an A.C. source 11, an ionization chamber 12, an A.C. amplifier 13 and an A.C. voltmeter 14 are the same as those shown in FIG. 2. A system for utilizing the bridge circuit shown in FIG. 3 to eliminate the leakage current flowing through the inter-electrode capacitance $Co$ is already kown in prior art. However, in the system shown in FIG. 3 it is difficult to balance the bridge completely and there is a fault that the performance becomes worse due to the unbalance of the bridge circuit after a long operating interval.

In subject invention, the faults and difficult points of an alternating current operation system stated above are solved by using the fact that the signal current under the A.C. operation includes a lot of odd harmonics.

In FIG. 4, an A.C. source 1 of frequency $fo$ is applied to an ionization chamber 2, the output thereof is applied to a load resistance 3 and a high-pass filter 4 passing the frequencies of signals above $3fo$. High-pass filter 4 is connected with an A.C. voltmeter 6 through an A.C. amplifier 5.

The relation between the applied voltage and the output current of the ionization chamber is generally shown in FIG. 5. It is seen that the output current saturates when the potential exceeds a certain value. Therefore, if an A.C. voltage of relatively large value is applied to the ionization chamber, the signal current flowing into the load resistance R through the internal resistance $Ro$, shown in the diagram of FIG. 4, will have the wave form shown in FIG. 6, which resembles a square wave. It is clear that the wave form shown in FIG. 6 includes plural odd harmonics. On the other hand, as stated above, the current flowing into the load resistance R through the inter-electrode capacitance $Co$ is a pure sinusoidal wave of frequency $fo$. Therefore, if the signal current is applied to a filter 4 which only passes the alternating current having the frequency above $3fo$, the component of the higher harmonics included in the signal current only appears at the output terminals and thus the effect of the error current due to the inter-electrode capacitance $Co$ can be eliminated. As the amount of the higher harmonics is proportional to the intensity of the nuclear radiation, the intensity of the nuclear radiation can be measured by amplifying the component of the higher harmonics by A.C. amplifier 5 and by measuring the output of A.C. amplifier 5 by means of A.C. voltmeter 6.

The third harmonic is the largest among the higher harmonics and, therefore, when a band-pass filter having frequency $3fo$ is used in place of high pass filter 4 the same effect can be obtained.

It will be noted from the above mentioned explanation that in order to apply the A.C. voltage to an ionization chamber the following conditions should be satisfied:

(a) A.C. voltage source 1 is pure sinusoidal wave, (b) High-pass filter (or band-pass filter) 4 attenuates sufficiantly the fundamental frequency of the A.C. source.

In FIG. 7, an example of a parallel T type band-pass filter is shown. When the frequency of the A.C. voltage source is 75 c./s. and two band-pass filters having 225 c./s. are used in series, a signal-to-noise ratio of 20 db is obtained at the D.C. level of $10^{-7}$ amperes. If the bandpass filter shown in FIG. 7 is used in combination with the bridge circuit shown in FIG. 3, the sensitivity is obtained up to an A.C. level of $10^{-13}$ amperes. Heretofore, when the bridge is used singly it is necessary to shield the bridge strictly and to adjust the bridge balance precisely, but when the bridge is used in combination with the system of the invention as described, a simple bridge can be used without precise balance and the bridge operates stably for long periods.

As stated above, the system of the invention is based on the fact that the signal current under A.C. operation of an ionization chamber includes a lot of odd harmonics and the fundamental wave of the leakage current is eliminated by means of a filter which can pass only the harmonics. Therefore a stable A.C. amplifier with technical easiness can be utilized to obtain a stable instrument for measuring nuclear radiations.

While preferred embodiments of the present invention are disclosed, it is recognized that the scope of the present invention be defined by the appended claim.

What I claim is:

1. In a system for measuring the intensity of nuclear radiation containing an ionization chamber, an A.C. source, a high pass filter, an A.C. amplifier and an A.C. meter, the method of providing a stable measurement unaffected by leakage current through the ionization chamber, comprising the steps of:
 (a) operating the chamber at a predetermined frequency $fo$ of the A.C. source;
 (b) exposing the chamber to a radiation dose;
 (c) filtering the chamber output current to pass only the odd harmonics of the signal output;
 (d) amplifying the odd harmonics; and
 (e) reading the intensity on the A.C. meter.

References Cited
UNITED STATES PATENTS

| | | | |
|---|---|---|---|
| 2,369,550 | 2/1945 | Frosch | 250—83.6 |
| 2,436,563 | 2/1948 | Frosch | 250—83.6 X |
| 2,986,636 | 5/1961 | Carlson et al. | 250—83.6 X |

ARCHIE R. BORCHELT, *Primary Examiner.*